United States Patent
Nakajima

(10) Patent No.: US 7,539,258 B2
(45) Date of Patent: May 26, 2009

(54) AUDIO DATA SYNC FORMAT DETECTING CIRCUIT

(75) Inventor: Toshimasa Nakajima, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 554 days.

(21) Appl. No.: 11/088,300

(22) Filed: Mar. 24, 2005

(65) Prior Publication Data

US 2005/0213681 A1 Sep. 29, 2005

(30) Foreign Application Priority Data

Mar. 29, 2004 (JP) .............................. 2004-093995

(51) Int. Cl.
*H04L 5/12* (2006.01)
(52) U.S. Cl. ...................... 375/265; 375/363; 375/365; 375/354; 375/362; 370/491; 370/500; 700/94
(58) Field of Classification Search ................. 375/365, 375/265, 362, 354; 370/491, 500; 700/94
See application file for complete search history.

(56) References Cited

U.S. PATENT DOCUMENTS 5,627,946 A * 5/1997 Strang, Jr. ................ 360/77.08
7,042,667 B2 * 5/2006 Maple et al. ................... 360/51
2002/0069390 A1 * 6/2002 Yamawaki .................. 714/798
2002/0150126 A1 * 10/2002 Kovacevic ................... 370/503

FOREIGN PATENT DOCUMENTS

JP 2003-076395 3/2003

* cited by examiner

*Primary Examiner*—Shuwang Liu
*Assistant Examiner*—Helene Tayong
(74) *Attorney, Agent, or Firm*—Pillsbury Winthrop Shaw Pittman LLP

(57) ABSTRACT

The present invention provides an audio data sync format detecting circuit that can minimize both the hardware configuration software processing, and furthermore, has a large flexibility with respect to unknown formats. Audio data is written in sequence into a data register, where the audio data are units having a predetermined number of bits. Samples of the format that is the object of detection are written in sequence into a register. A comparator compares the data in the sample register and the data in the data register. A control circuit receives hit signals and outputs an interrupt signal to the controller, and the controller writes in sequence samples of the format that is the object of detection into the register each time an interrupt signal is received. When hit signal is continuously output a predetermined number of times, a match detection circuit outputs a format match signal.

7 Claims, 7 Drawing Sheets

AUDIO DATA SYNC FORMAT DETECTING CIRCUIT

BACKGROUND OF THE INVENTION

1. Field of the Invention

The present invention relates to an audio data synchronization format (sync format) detection circuit that can handle unknown new formats for digital audio by a minimum of software modifications.

Priority is claimed on Japanese Patent Application No. 2004-93995, filed Mar. 29, 2004, the content of which is incorporated herein by reference.

2. Description of Related Art

It is well-known that a sync format that indicates an audio standard, such as AC3, DTS, AAC, or the like, is attached at the head of digital audio data. FIG. 6 shows an example of a sync format. This figure shows the IEC 61937 sync format for AC3. As shown in the figure, the IEC 61937 sync format is stipulated to have six successive samples, where one sample is 48 bits. In addition, a configuration is used in which three samples that differ for each standard are added to the three common samples referred to as the IEC 61937 format.

FIG. 7 shows the IEC 60958 format, and this format is normally formed by two samples. In addition, a detection circuit that detects these sync formats is provided in the audio decoder.

Such kind of an audio signal processing apparatus that is equipped with a sync format detecting circuit is disclosed in Japanese Unexamined Patent Application, First Publication, No. 2003-76395.

Conventionally, when a new audio standard is created, naturally a sync format detecting circuit that detects the new format becomes necessary. Therefore, preferably a sync format detecting circuit that can handle future formats with minor modifications should be disposed in advance in the presently manufactured audio decoders as well.

It is possible to handle these new formats with only modifications of the software of the CPU (central processing unit). However, in this case, there is the problem that the CPU load becomes large. In addition, providing in advance hardware that assumes there will be new formats can be considered. However, in this case, the flexibility becomes small, and there are limits to handling unknown formats. When ample flexibility is provided, there are problems related to the enlargement of the hardware, such as an increase in the LSI chip area and an increase in the power consumption.

SUMMARY OF THE INVENTION

In consideration of the problems described above, it is an object of the present invention to provide an audio decoder sync format detecting circuit that can minimize both the hardware configuration and the software processing, and furthermore, provides a large flexibility with respect to unknown formats.

In order to solve the problems described above, the audio data sync format detecting circuit of the present invention provides a data register into which the audio data is written in sequence in units having a fixed number of bits; a sample register into which samples of the format that is the object of detection are written, where these samples are units having a fixed number of bits; a comparator that compares the data in the sample register and data in the data register, and when these both match, outputs a hit signal; a writing device that receives the hit signal and writes in sequence samples of the format that is the object of detection into the sample register; and a match determining device that outputs a format match signal when hit signals are continuously output a predetermined number of times.

This audio data sync format detecting circuit may further provide a mask register in which mask data is written, where this mask data indicates a bit that is to be masked among each of the bits in the sample of the format that is the object of detection, and the comparator outputs a hit signal when, excluding the bit indicated by the mask register, each bit matches; and the writing device, after receiving the hit signal, writes in sequence samples of the format that is the object of detection into the sample register, and at the same time, writes in sequence mask data corresponding to the sample in the mask register.

Furthermore, the audio data sync format detecting circuit of the present invention provides a data register into which audio data is written in sequence in units having a fixed number of bits; a first sample register into which a first sample among the plurality of samples of the format that is the object of detection is written, where the samples are units having a fixed number of bits; a second sample register into which a plurality of samples of the format that is the object of detection are written in sequence; a first comparator that compares the data in the first sample register and the data in the data register, and when both match, outputs a syncstart signal; a second comparator that compares the data in the second sample register and the data in the data register, and when both match, outputs a hit signal; a writing device that receives the syncstart signal and thereafter, each time a hit signal is received, writes in sequence the second and subsequent samples of the format that is the object of detection into the second sample register; and a match detecting device that outputs a format match signal when the hit signal is continuously output a predetermined number of times.

This audio data sync format detecting circuit may further provide a first mask register into which mask data is written, where this mask data indicates a bit of the first sample of the format that is the object of detection that is to be masked; and a second mask register into which mask data is written, where this mask data indicates the bit of each sample of the format that is the object of detection that is to be masked; and the first comparator outputs a hit signal when, excluding the bit indicated by the first mask register, each of the bits match, and the second comparator outputs a hit signal when, excluding the bit indicated by the second mask register, each bit matches; and the writing device, when a syncstart signal is received, thereafter writes in sequence the second and subsequent samples of the format that is the object of detection into the second sample register each time a hit signal is received, and at the same time, writes in sequence the mask data corresponding to the sample into the second mask register.

DETAILED DESCRIPTION OF THE INVENTION

Now, an embodiment of the present invention will be explained below with reference to the drawings.

Figure 1:
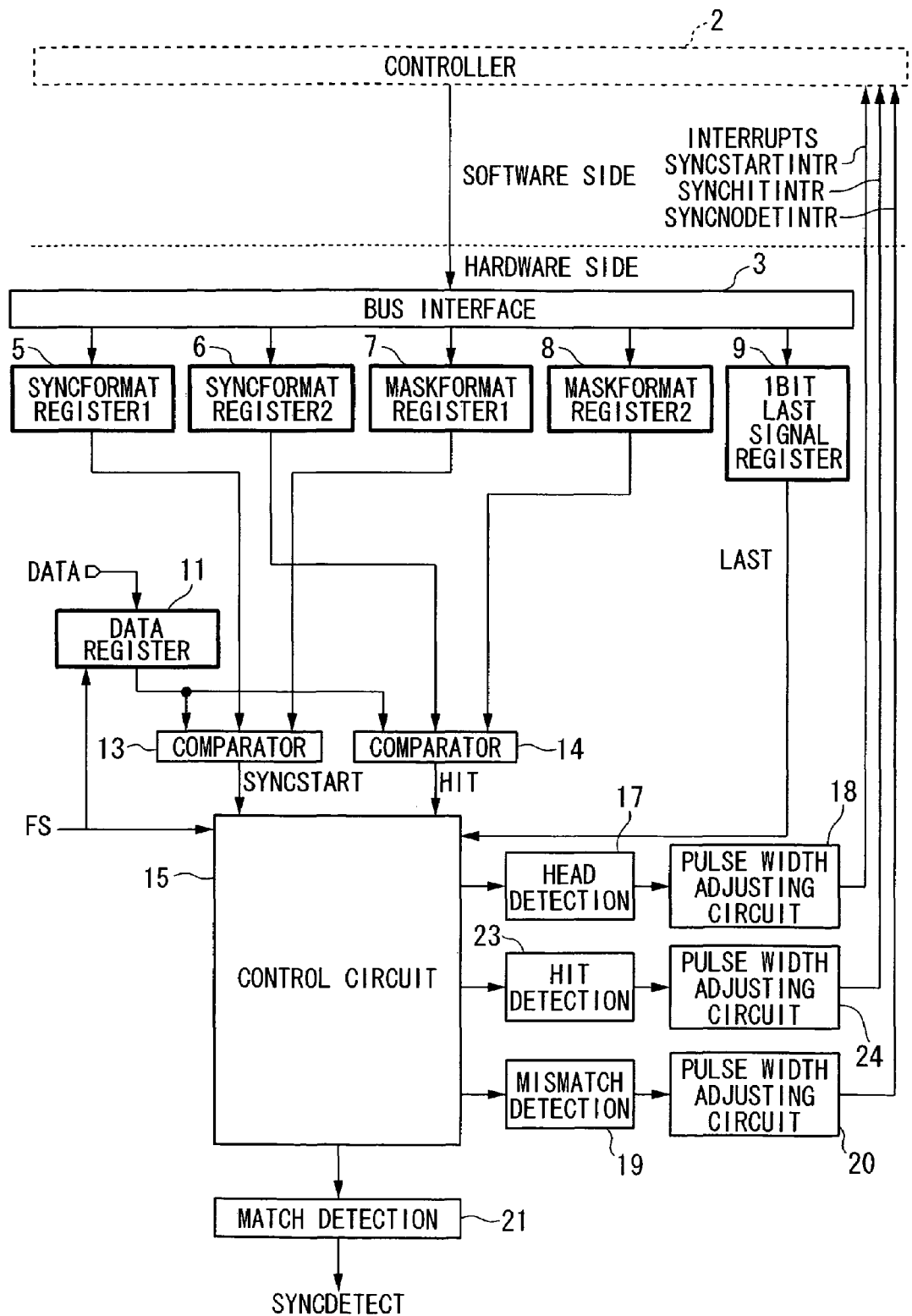
FIG. 1 is a block diagram showing the configuration of the audio data sync format detecting circuit according to an embodiment of the present invention.

FIG. 1 is a block diagram showing an audio data sync format detecting circuit according to an embodiment of the present invention.

In this figure, the controller 2 of the audio decoder is formed by a CPU (or DSP), ROM, RAM, and the like, and is connected to a bus interface 3. First and second 48 bit sync format registers 5 and 6, first and second 48 bit mask format registers 7 and 8, and a 1 bit last signal register 9 are connected to the bus interface 3. The controller 2 can write into any of these registers.

The audio data is written into a data register 11 in units of 48 bits according to a timing based on a clock signal Fs that corresponds to the sampling frequency. A first comparator 13 is connected to the data register 11, the first sync format register 5, and the first mask format register 7. The first comparator 13 compares the data in the data register 11 and the data of the sync format register 5, and when both match, outputs a SyncStart signal to a control circuit 15. In this case, the bit(s) whose value is "1" in the mask format register 7 is (are) not compared by the first comparator 13.

Similarly, a second comparator 14 is connected to the data register 11, the second sync format register 6, and the second mask format register 8. The second comparator 14 compares the data in the data register 11 and the data in the sync format register 6, and when both match, outputs a hit signal to the control circuit 15. In this case also, the bit(s) whose value is "1" in the mask format register 8 is (are) not compared by the second comparator 14.

The control circuit 15 generates and outputs various types of control signals based on the SyncStart signal and the hit signal at a timing based on the clock signal Fs. A head detecting circuit 17 detects the head of the audio data, that is, the first sample of the sync format, based on the output of the control circuit 15, and outputs the interrupt signal SyncStartIntr to the controller 2 via a pulse width adjusting circuit 18. A hit detecting circuit 23 outputs an interrupt signal SincHitIntr to the controller 2 via a pulse width adjustment circuit 24 each time the second sample to sixth sample of the sync format (in the case that the sync format is formed by 6 samples) match the data in the data register 11.

A mismatch detecting circuit 19 outputs an interrupt signal SyncNoDetIntr to the controller 2 via a pulse width adjusting circuit 20 when the sync format of the audio data does not match the format that is the object of detection. A match detecting circuit 21 outputs an interrupt signal SyncDetect to the controller 2 in the case that the sync format of the audio data matches the format that is the object of detection.

The controller 2 stores the data of the first sample of the sync format into the sync format register 5 and the mask format register 7 at a discretionary timing. In addition, the controller 2 also stores the next sync format sample into the sync format register 6 and the mask format register 8 after receiving the interrupt signal SyncStartIntr. Subsequently, each time the interrupt signal SyncHitIntr is received, the controller 2 stores the next sync format sample into the sync format register 6 and the mask format register 8. When the interrupt signal SyncNoDetIntr is received during the format detection, the detection is suspended, and processing of the software related to detection is not carried out until the next interrupt signal SyncStartIntr is received.

Next, the operation of the circuits described above will be explained with reference to the timing charts shown in FIG. 2 to FIG. 5.

Figure 2:
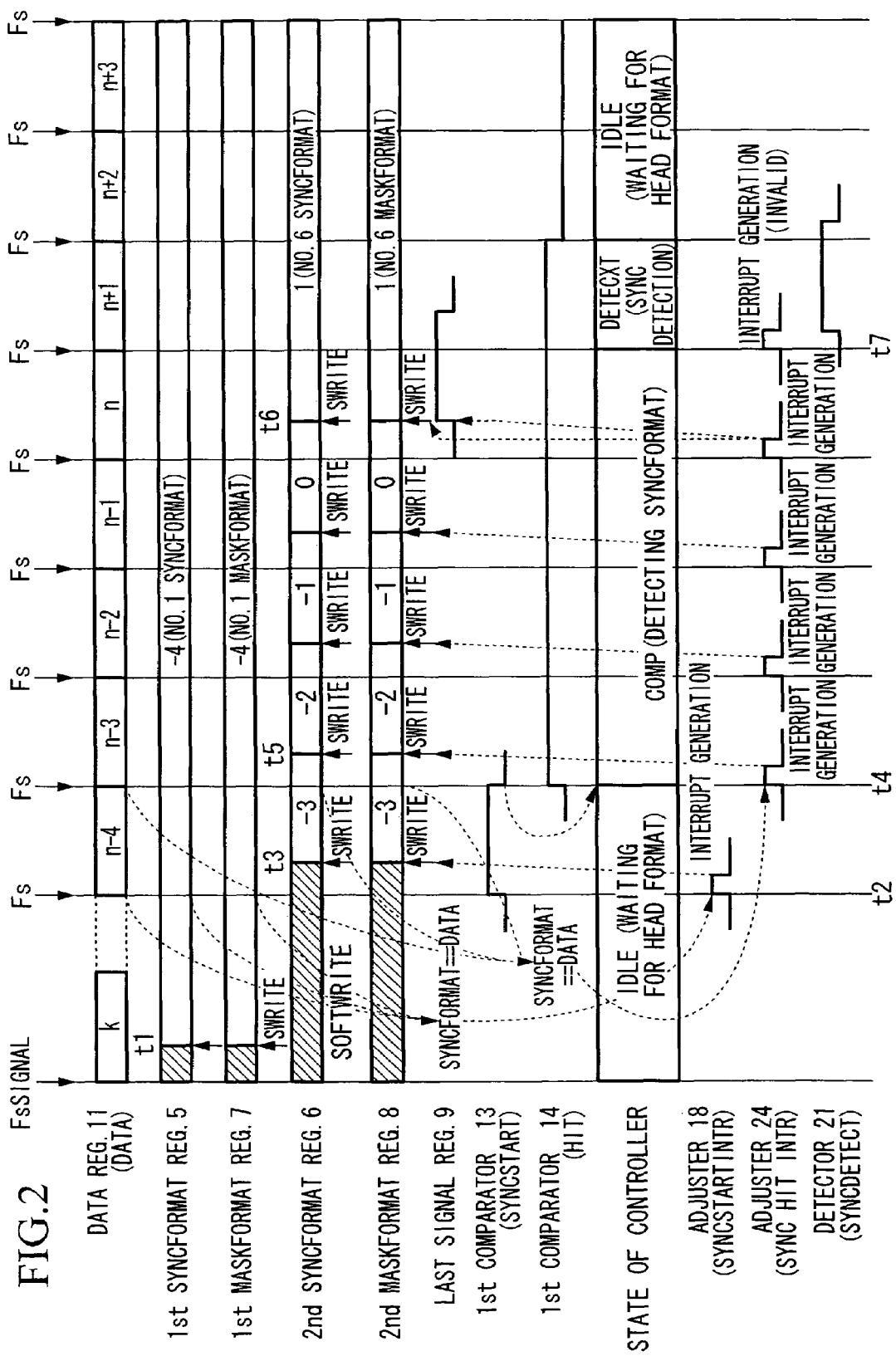
FIG. 2 is a timing chart for explaining the operation of the embodiment of the present invention.

First, the case in which the sync format of the audio data matches the sync format that is the object of detection will be explained with reference to FIG. 2.

Here, six samples of the sync format that is the object of detection are set in the controller 2. When the user instructs decoding to start, the controller 2 sets the first sample (48 bits) of the sync format that is the object of detection in the sync format register 5, and in addition, sets the mask data in the mask format register 7 (time t1). Next, when the reading of the audio data is started, the first data (48 bits) is read into the data register 11 according to the timing of the signal Fs (time t2). Subsequently, the audio data is read in sequence into the data register 11 in 48 bit units according to the timing of the signal Fs.

When the first data (48 bits) of the audio data matches the first sample of the sync format that is the object of detection, the SyncStart signal is output from the comparator 13 to the control circuit 15. The control circuit 15 outputs this SyncStart signal along with the state signal IDLE to the head detecting circuit 17. The head detecting circuit 17 receives these signals, and outputs the interrupt signal SyncStartIntr to the controller 2 via the pulse width adjusting circuit 18. Upon receiving this interrupt signal SyncStartIntr, the controller 2 writes the second sample of the sync format that is the object of detection into the sync format register 6, and writes the mask data of the second sample into the mask format register 8 (time t3). Note that the sync format register 5 and the mask format register 7 are registers into which the first sample of the sync format that is the object of detection and mask data thereof are written, respectively, to detect the first sample of the sync format of the audio data.

Next, at the timing (time t4) of the signal Fs, the control circuit 15 checks the output of the comparator 14. In the case that the hit signal has been output from the comparator 14, that is, in the case that the second data (48 bits) of the audio data matches the second sample of the sync format that is the object of detection, the control circuit 15 outputs the hit signal and the state signal COMP to the hit detecting circuit 23. The hit detecting circuit 23 receives these signals, and outputs an interrupt signal SyncHitIntr to the controller 2 via the pulse width adjusting circuit 24. Upon receiving this interrupt signal SyncHitIntr, the controller 2 writes the third sample of the sync format that is the object of detection into the sync format register 6, and writes the mask data of the third sample into the mask format register 8 (time t5).

Thereafter, the same processing is repeated. In addition, the controller 2 writes the last sample of the sync format that is the object of detection into the sync format register 6, writes the mask data thereof into the mask format register 8, and writes the Last signal into the register 9 (time t6). The control circuit 15 receives this Last signal, and according to the timing (time t7) of the next signal Fs, checks the output of the comparator 14. The comparator 14 outputs a hit signal, but because the Last signal is output, the interrupt signal SyncHitIntr output from the detecting circuit 23 via the pulse width adjusting circuit 24 becomes invalid with respect to the software side. Because the hit signal is output from the comparator 14, the control circuit 15 outputs the state signal DETECT to the match detecting circuit 21. The match detecting circuit 21 receives this state signal DETECT, and outputs the SyncDetect signal to the controller 2. Due to this SyncDetect, the controller 2 detects that the audio data has the sync format that is the object of detection.

Figure 3:
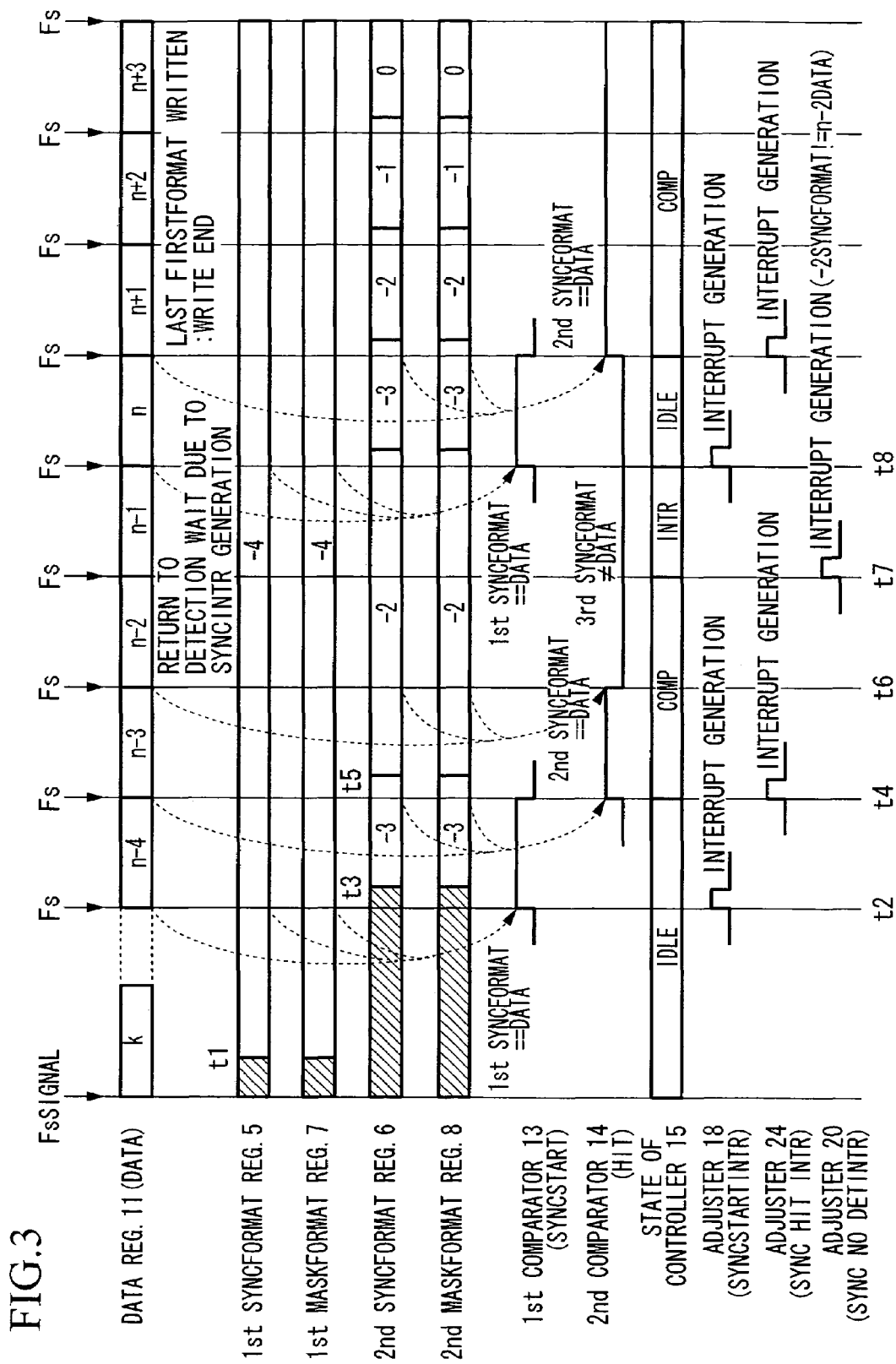
FIG. 3 is a timing chart for explaining the operation of the embodiment of the present invention.

Next, the case in which the sync format of the audio data does not match the sync format that is the object of detection will be explained with reference to FIG. 3.

When the user instructs decoding to start, the controller 2 sets the first sample (48 bits) of the sync format that is the object of detection in the sync format register 5, and sets the mask data in the mask format register 7 (time t1). Next, when the signal Fs is output, the first data (48 bits) are read into the data register 11 (time 2).

In the case that the first data (48 bits) of the audio data matches the first sample of the sync format that is the object of detection, the comparator 13 outputs the SyncStart signal at time t2. The control circuit 15 outputs the SyncStart signal to the head detecting circuit 17. The head detecting circuit 17 receives this signal, and outputs an interrupt signal SyncStartIntr to the controller 2 via the pulse width adjusting circuit 18. Upon receiving this interrupt signal SyncStartIntr, the controller 2 writes the second sample of the sync format that is the object of detection into the sync format register 6, and writes the mask data of the second signal into the mask format register 8 (time t3).

Next, when the signal Fs is output at time t4, the second data set of the audio data is read into the data register 11. According to the timing (time t4) of the signal Fs, the control circuit 15 checks the output of the comparator 14. When the hit signal has been output from the comparator 14, that is, when the second data set (48 bits) of the audio data matches the second sample of the sync format that is the object of detection, a hit signal and a state signal COMP are output to the hit detecting circuit 23. The hit detecting circuit 23 receives these signals, and outputs the interrupt signal SynHitIntr to the controller 2 via the pulse width adjusting circuit 24. Upon receiving this interrupt signal SynHitIntr, the controller 2 writes the third sample of the sync format that is the object of detection into the format register 6, and writes the mask data of the third sample into the mask format register 8 (time t5).

Next, when the signal Fs is output, the third data set (48 bits) of the audio data is read into the data register 11 (time t6). According to the timing of this signal Fs, the controller 15 checks the output of the comparator 14. Here, when the third sample of the sync format that is the object of detection and the third data set of the audio data do not match, the hit signal is not output from the comparator 14. In this case, the control circuit 15 does not output a signal to the hit detecting circuit 23, and therefore, the interrupt signal SynHitIntr is not output from the hit detecting circuit 23.

According to the timing (time t7) of the next signal Fs, the control circuit 15 outputs the state signal INTR to the mismatch detecting circuit 19. The mismatch detecting circuit 19 receives this state signal INTR, and outputs the interrupt signal SyncNoDetIntr to the controller 2 via the pulse width adjusting circuit 20.

Next, when the signal Fs is output, the next audio data is read into the register 11 (time t8). When this audio data and the data in the sync format register 5 match, a SyncStart signal is output from the comparator 13 at time t8, and input into the head detecting circuit 17 via the control circuit 15. The head detecting circuit 17 receives this SyncStart signal, and outputs the interrupt signal SyncStartIntr to the controller 2 via the pulse width adjusting circuit 18. Upon receiving this interrupt signal SyncStartIntr, the controller 2 writes the second sample of the sync format that is the object of detection into the sync format register 6, and writes the mask data for the second sample into the mask format register 8. Thereafter, processing that is identical to that of the case described above is repeated.

Figure 4:
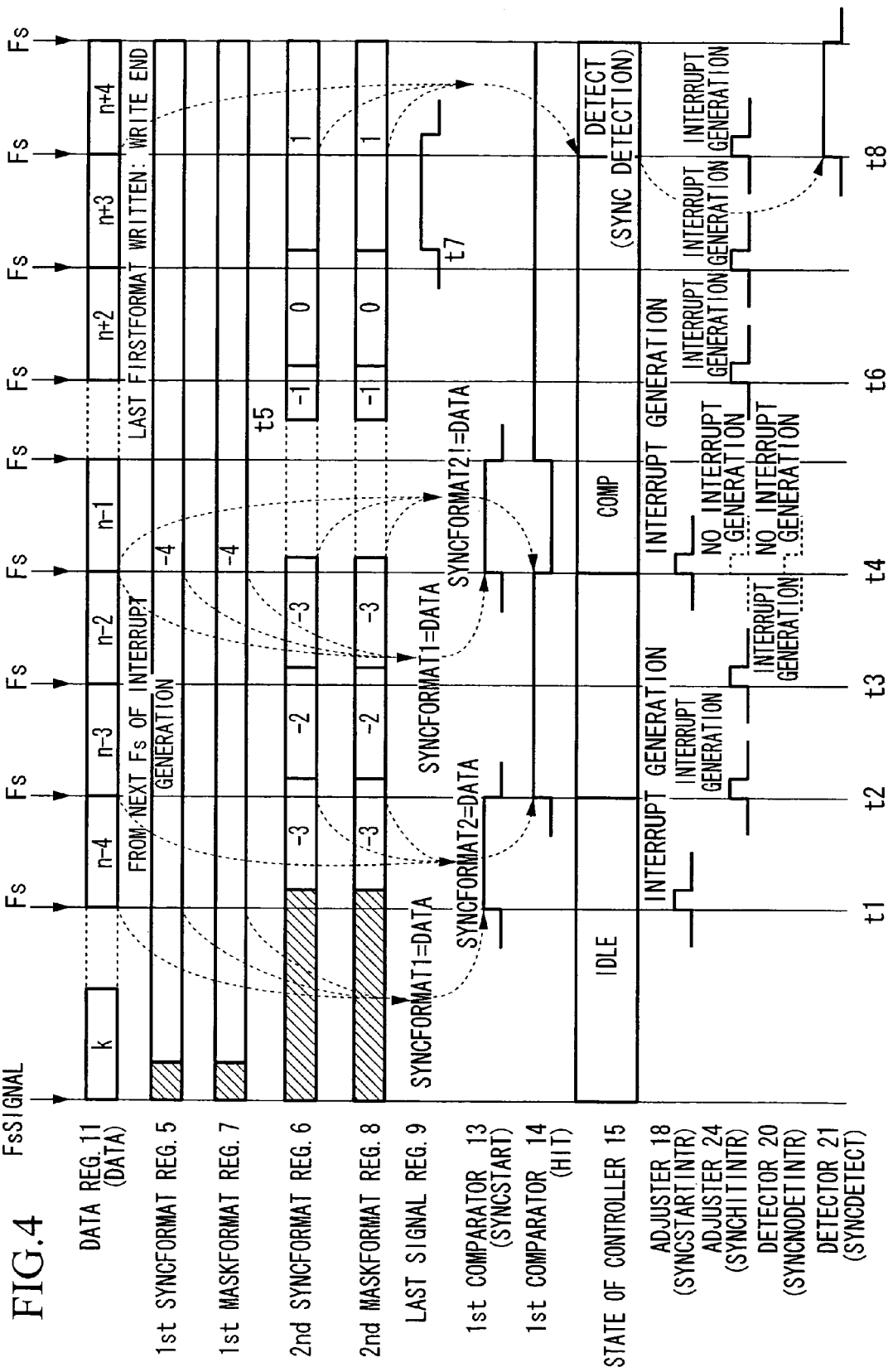
FIG. 4 is a timing chart for explaining the operation of the embodiment of the present invention.

Next, FIG. 4 shows the case in which, the interrupt signal SyncStartIntr is output to the controller 2 at time t1, the interrupt signal SynHitIntr is output to the controller 2 at times t2 and t3, and the hit signal is not output at time t4 while the signal SyncStart is output again. That is, this is the case in which the first through third data sets of the audio data match the first through third samples of the sync format that is the object of detection, and the fourth data set of the audio data does not match the fourth sample of the sync format that is the object of detection, but matches the first sample of the sync format.

In this case, the interrupt signal SyncNoDetIntr is not output from the mismatch detecting circuit 19 at time t4, while the interrupt signal SyncStartIntr is output to the controller 2 from the head detecting circuit 17. Next, the controller 2 sets the sync format that is the object of detection in the sync format register 6 and the mask format register 8 at time t5, and the comparison operation between the audio data and the sync format that is the object of detection is repeated at time t6 and thereafter. The Last signal, which indicates the last sample of the sync format, is written into the register 9 by the controller 2 at time t7. When the audio data matches the last sample of the sync format that is the object of detection, the detection signal SyncDetect is output from the match detecting circuit 21 at time t8.

Figure 5:
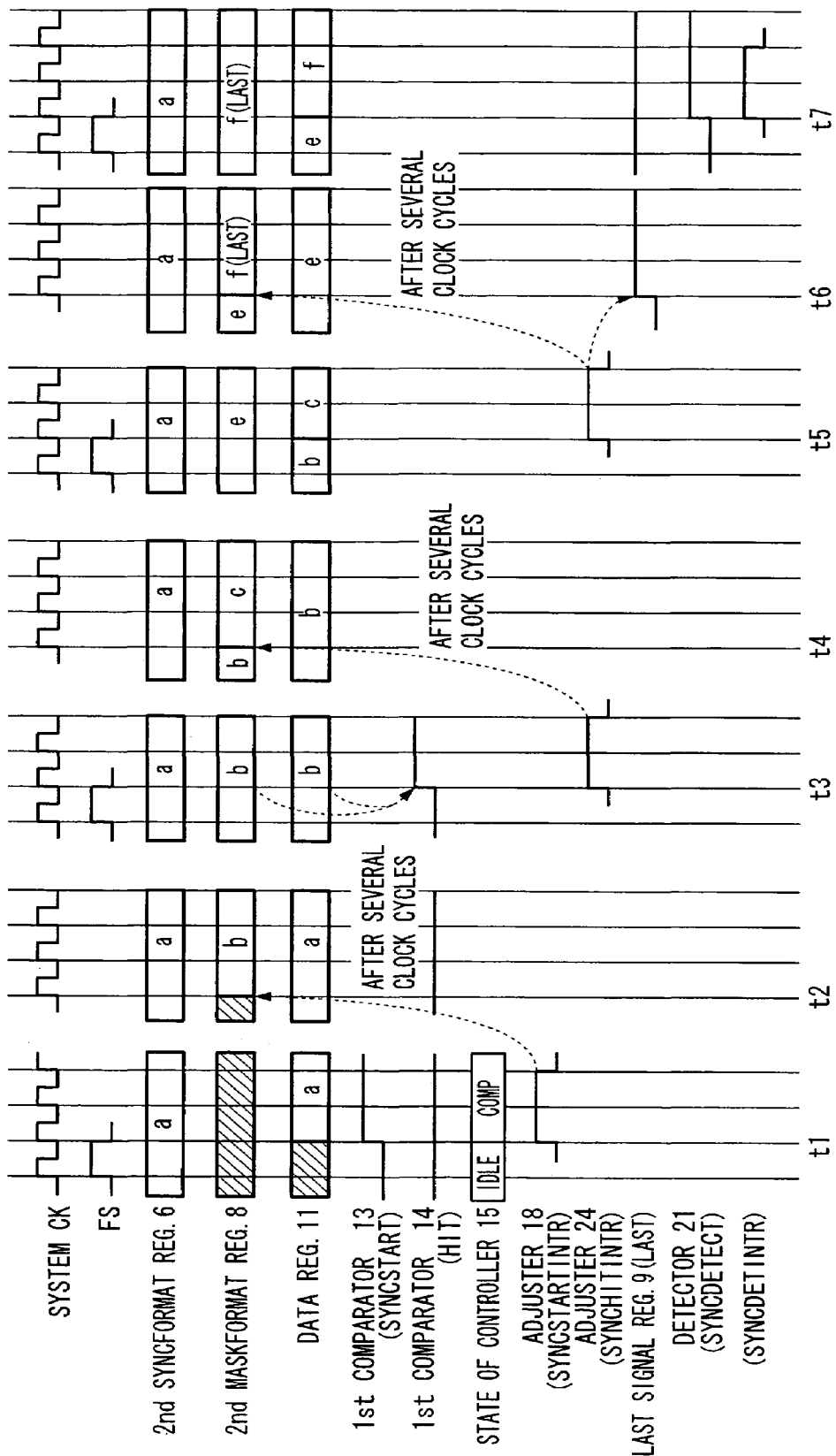
FIG. 5 is a timing chart for explaining the operation of the embodiment of the present invention.
Figure 6:
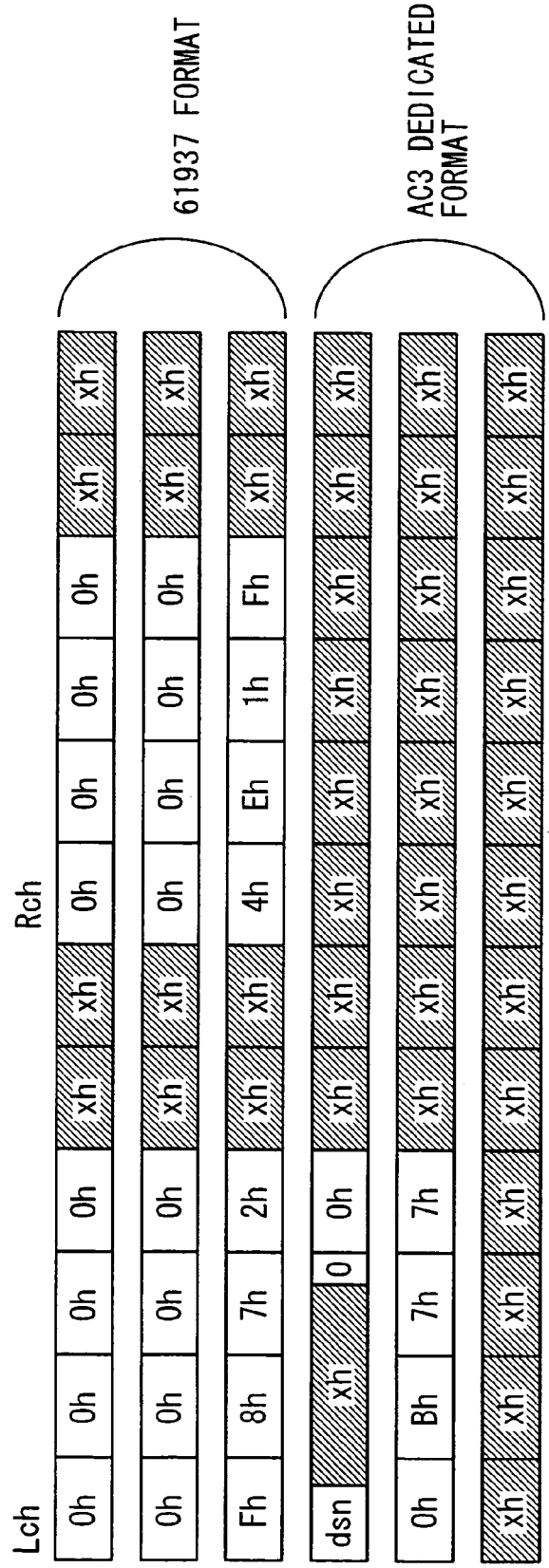
FIG. 6 is a drawing for explaining an example of the sync format of the audio data.
Figure 7:
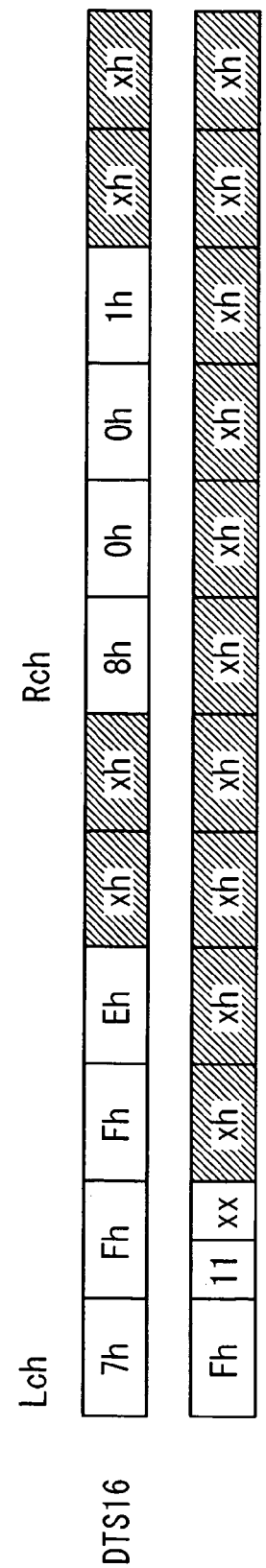
FIG. 7 is a drawing for explaining an other example of the sync format of the audio data.

FIG. 5 shows the case in which the sync format that is the object of detection has a 4-sample configuration. At time t1, the interrupt signal SyncStartIntr is output to the controller 2 from the head detecting circuit 17 via the pulse width adjusting circuit 18. At time t2, the controller 2 sets the second sample of the sync format that is the object of detection in the sync format register 6 and the mask format register 8. At time t3, the interrupt signal SynHitIntr is output from the hit detecting circuit 23 to the controller 2 via the pulse width adjusting circuit 24. At time t4, the controller 2 sets the third sample of the sync format that is the object of detection in the sync format register 6 and the mask format register 8. At time t5, the interrupt signal SynHitIntr is output from the hit detecting circuit 23 to the controller 2 via the pulse width adjusting circuit 24. At time t6, the controller 2 sets the fourth (last) sample of the sync format that is the object of detection in the sync format register 6 and the mask format register 8, and sets the Last signal in the register 9. At time t7, a match signal SynDetect is output from the match circuit 21 to the controller 2.

As has been explained above, according to the present invention, it is possible to configure the hardware with a few registers and, furthermore, the sync formats that can be detected are practically unlimited. This is a clear contrast to a conventional art in which an enormous number of registers are necessary to realize a total hardware implementation. Thereby, according to the present invention, there are the remarkable effects that it becomes possible to handle unknown formats that will appear in the future simply by modifying the software without modifying the hardware. This enables the costs of adapting unknown formats to be reduced, and the compatibility with formats to be attained quickly. Needless to say, the format detecting circuit according to the present invention can also detect formats configured by any arbitrary number of samples, not just formats configured by 6 samples or 2 samples.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An audio data sync format detecting circuit comprising:
   a data register into which audio data is written in sequential units per a predetermined period;
   a first sync format register which stores a first sample of sync format data which indicates a format of audio data, the sync format data including a plurality of subsequent samples in addition to the first sample;
   a second sync format register which stores the plurality of subsequent samples of the sync format data, the plurality of subsequent samples being stored one subsequent sample at a time;
   a first comparator that compares the first sample stored in the first sync format register with data written to the data register, and outputs a sync start signal when the first sample matches the data written to the data register;
   a second comparator that compares the subsequent sample stored in the second sync format register with data written to the data register, and outputs a hit signal when any one of the subsequent samples matches the data written to the data register; and
   a control circuit that writes a first subsequent sample to the second sync format register in response to the sync start signal, updates the second sync format register with subsequent samples each time the hit signal is output, and outputs a format match signal when the hit signal is output a predetermined number of consecutive times,
   wherein the first sync format register retains the first sample of sync format data and the first comparator continues to compare the retained first sample with data written into the data register to potentially output a sync start signal to restart sync detection by the sync format detecting circuit, independently of whether one or more hit signals have been output by the second comparator since a previous sync start signal.

2. The audio data sync format detecting circuit as recited in claim 1 wherein the predetermined period is based on a clock corresponding to a sampling frequency.

3. The audio data sync format detecting circuit as recited in claim 1, further including:
   a first mask register into which first mask data is written, where said first mask data indicates a bit of said first sample to be masked; and
   a second mask register into which second mask data is written, where said second mask data indicates a bit of said subsequent samples to be masked,
   wherein said first comparator compares the first sample in the first sync format register with the data written to the data register except said bit indicated by said first mask register, and the second comparator compares the subsequent samples in the second sync format register with the data written to the data register except said bit indicated by said second mask register.

4. The audio data sync format detecting circuit as recited in claim 1, wherein when the second comparator fails to output a hit signal by an expected time, a no-sync-detected interrupt signal is generated indicating a mismatch between the sync format data and the audio data.

5. The audio data sync format detecting circuit as recited in claim 1 wherein the sync start signal is output to restart sync detection at a time which coincides with a time at which the second comparator fails to output an expected hit signal.

6. The audio data sync format detecting circuit as recited in claim 5, wherein the time at which the second comparator fails to output the expected hit signal is immediately subsequent to at least two consecutive occurrences of the hit signal.

7. An audio data sync format detecting method for an audio decoder, the method comprising:
   writing audio data in sequential units to a data register;
   writing to a first sync format register a first sample of sync format data which indicates a format of audio data, the sync format data including a plurality of subsequent samples in addition to the first sample;
   writing to a second sync format register the plurality of subsequent samples of the sync format data, the plurality of subsequent samples being written one subsequent sample at a time;
   comparing the first sample stored in the first sync format register with data written to the data register, and outputting a sync start signal when the first sample matches the data written to the data register;
   comparing the subsequent samples stored in the second sync format register with data written to the data register, and outputting a hit signal when any one of the subsequent samples matches the data written to the data register;
   writing a first subsequent sample to the second sync format register in response to the sync start signal;
   updating the second sync format register with subsequent samples each time the hit signal is output; and
   outputting a format match signal when the hit signal is output a predetermined number of consecutive times,
   wherein the first sync format register retains the first sample of sync format data, and the retained first sample continues to be compared with data written into the data register to potentially output a sync start signal to restart sync detection, independently of whether one or more hit signals have been output since a previous sync start signal.

* * * * *